United States Patent
Forsythe et al.

(10) Patent No.: US 12,296,792 B2
(45) Date of Patent: May 13, 2025

(54) ELECTROSTATIC SENSOR CLEANING

(71) Applicant: Ford Global Technologies, LLC, Dearborn, MI (US)

(72) Inventors: Lorne Forsythe, Novi, MI (US); Lars Niklas Pettersson, Novi, MI (US); Venkatesh Krishnan, Canton, MI (US); Michael Robertson, Jr., Garden City, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 185 days.

(21) Appl. No.: 17/931,972

(22) Filed: Sep. 14, 2022

(65) Prior Publication Data
US 2024/0083392 A1    Mar. 14, 2024

(51) Int. Cl.
*B60S 1/56*    (2006.01)
*B60S 1/08*    (2006.01)

(52) U.S. Cl.
CPC .............. *B60S 1/56* (2013.01); *B60S 1/0848* (2013.01)

(58) Field of Classification Search
CPC ................................ B60S 1/56; B60S 1/0848
USPC ........................................................ 701/36
See application file for complete search history.

(56) References Cited

U.S. PATENT DOCUMENTS

| | | | |
|---|---|---|---|
| 8,091,167 B2 | 1/2012 | Teo et al. | |
| 10,511,748 B2* | 12/2019 | Barton | ............... G02B 27/0006 |
| 2010/0254698 A1 | 10/2010 | Louis | |
| 2013/0263393 A1* | 10/2013 | Mazumder | ............. A47L 13/40 |
| | | | 427/535 |
| 2021/0109345 A1* | 4/2021 | Robertson, Jr. | ....... G01S 7/4043 |

FOREIGN PATENT DOCUMENTS

EP    3501919 B1    8/2021

OTHER PUBLICATIONS

Perfetto, I., "Dancing dust—cleaning solar panels withoutwater," COSMOS—The Science of Everything, Mar. 14, 2022, 6 pages.
Chandler, D., "How to Clean Solar Panels Without Water," MIT News, 6 pages.

* cited by examiner

*Primary Examiner* — Adam D Tissot
(74) *Attorney, Agent, or Firm* — Frank A. MacKenzie; Brooks Kushman P.C.

(57) ABSTRACT

A sensor-cleaning system includes a sensor of a vehicle, an electrode, and a computer communicatively coupled to the electrode. The sensor includes a lens. The electrode is positioned to draw dust from the lens when the electrode is energized. The computer is programmed to energize the electrode in response to the vehicle moving and deenergize the electrode in response to the vehicle being stationary.

20 Claims, 4 Drawing Sheets

ELECTROSTATIC SENSOR CLEANING

BACKGROUND

Vehicles often include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (lidar) devices, and image processing sensors such as cameras.

DETAILED DESCRIPTION

Figure 1A:
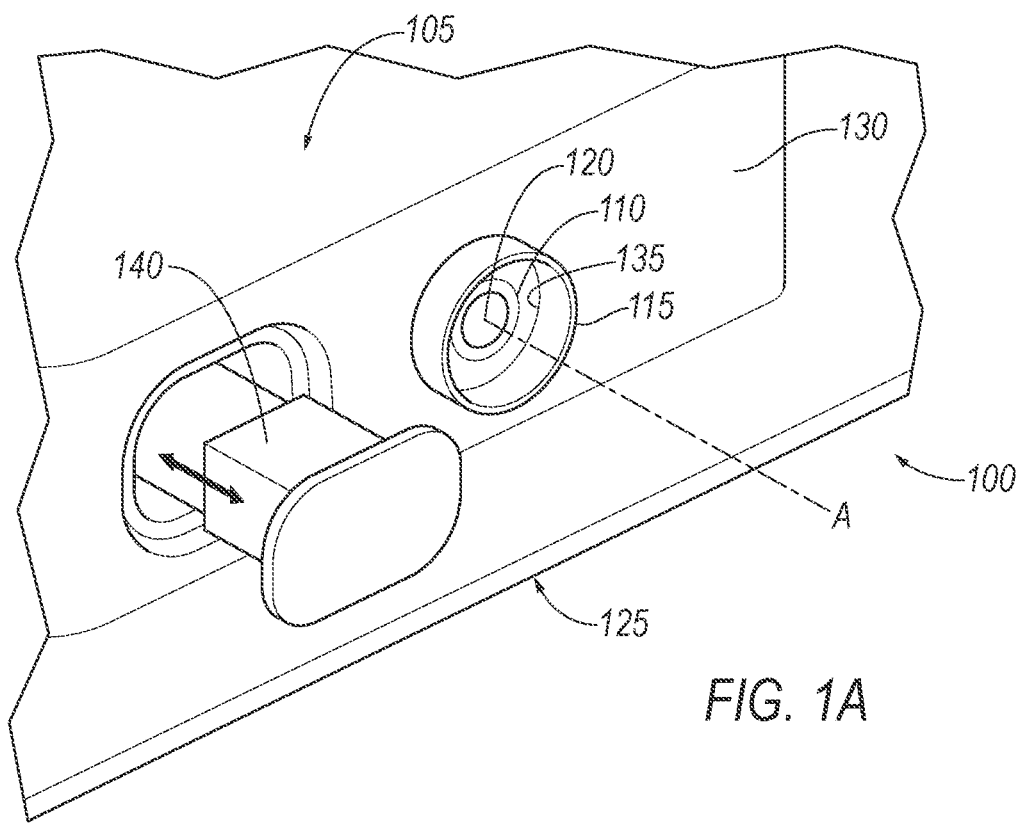
FIG. 1A is a perspective view of an example sensor-cleaning system on a vehicle.

A sensor-cleaning system includes a sensor of a vehicle, the sensor including a lens; an electrode positioned to draw dust from the lens when the electrode is energized; and a computer communicatively coupled to the electrode. The computer is programmed to energize the electrode in response to the vehicle moving and deenergize the electrode in response to the vehicle being stationary.

In an example, the computer may be communicatively coupled to the sensor, and the computer may be further programmed to deenergize the electrode upon determining that a person is present based on data from the sensor.

In an example, the computer may be further programmed to determine a dirtiness metric for the sensor. In a further example, the programming to energize the electrode in response to the vehicle moving may include programming to energize the electrode in response to the vehicle moving and the dirtiness metric being above a threshold, and the computer may be further programmed to deenergize the electrode in response to the dirtiness metric being below the threshold. In a yet further example, the threshold may be a low threshold, the programming to deenergize the electrode in response to the vehicle being stationary may include programming to deenergize the electrode in response to the vehicle being stationary and the dirtiness metric being below a high threshold, the computer may be further programmed to energize the electrode in response to the vehicle being stationary and the dirtiness metric being above the high threshold, and the high threshold may be higher than the low threshold. In a yet further example, the programming to deenergize the electrode in response to the vehicle being stationary may include programming to deenergize the electrode in response to the vehicle being stationary and a person being present for any value of the dirtiness metric.

In another further example, the computer may be communicatively coupled to the sensor, and determining the dirtiness metric may be based on data from the sensor.

In another further example, determining the dirtiness metric may be based on an air quality index for a current location of the vehicle.

In an example, the sensor may define an axis extending through a middle of a field of view of the sensor, and the electrode may be offset from the lens along the axis.

In an example, the electrode may be stationary.

In an example, the electrode may be movable between an extended position and a retracted position. In a further example, the computer may be further programmed to instruct the electrode to move to the extended position in response to energizing the electrode.

In another further example, the computer may be further programmed to instruct the electrode to move to the retracted position in response to deenergizing the electrode.

In another further example, the sensor may define an axis extending through a middle of a field of view of the sensor, and the electrode may be movable between the extended position and the retracted position along the axis.

In another further example, the sensor-cleaning system may further include a rail fixed relative to the sensor, and the electrode may be movable between the extended position and the retracted position along the rail.

In an example, the sensor may define an axis extending through a middle of a field of view of the sensor, and the electrode may extend completely around the axis.

In an example, the lens may include a coating that is conductive. In a further example, the sensor may be a camera, and the coating may be transparent.

In an example, the programming to deenergize the electrode in response to the vehicle being stationary may include programming to deenergize the electrode in response to the vehicle being stationary while the vehicle is on.

A method includes energizing an electrode in response to a vehicle moving and deenergizing the electrode in response to the vehicle being stationary. The vehicle includes the electrode and a sensor including a lens. The electrode is positioned to draw dust from the lens when the electrode is energized With reference to the Figures, wherein like numerals indicate like parts throughout the several views, a sensor-cleaning system 105 includes a sensor 110 of a vehicle 100, an electrode 115, and a computer 200 communicatively coupled to the electrode 115. The sensor 110 includes a lens 120. The electrode 115 is positioned to draw dust from the lens 120 when the electrode 115 is energized. The computer 200 is programmed to energize the electrode 115 in response to the vehicle 100 moving and deenergize the electrode 115 in response to the vehicle 100 being stationary.

The electrode 115 provides a way to clean the sensor 110, particularly in dusty conditions such as offroading. The electrode 115 does not consume washer fluid, thereby preserving washer fluid for other uses on board the vehicle 100. The electrode 115 may also thereby reduce a number of components of the vehicle 100 by eliminating nozzles, supply lines, etc. for providing washer fluid to the sensor 110. The programming of the computer 200 may ensure that the electrode 115 is cleaning the sensor 110 when such cleaning is useful, i.e., when the vehicle 100 is moving, and that the electrode 115 is not energized when a person may touch the electrode 115, i.e., when the vehicle 100 is stationary.

With reference to FIGS. 1A-D, the vehicle 100 may be any passenger or commercial automobile such as a car, a truck, a sport utility vehicle, a crossover, a van, a minivan, a taxi, a bus, etc.

The vehicle 100 includes a body 125. The vehicle 100 may be of a unibody construction, in which a frame and the body 125 of the vehicle 100 are a single component. The vehicle 100 may, alternatively, be of a body-on-frame construction, in which the frame supports the body 125 that is a separate component from the frame. The frame and body 125 may be formed of any suitable material, for example, steel, aluminum, etc.

The body 125 includes body panels 130 partially defining an exterior of the vehicle 100. The body panels 130 may present a class-A surface, e.g., a finished surface exposed to view by a customer and free of unaesthetic blemishes and defects. The body panels 130 include, e.g., a front bumper or grill, a rear bumper or trunk, etc.

The sensor 110 may detect the external world, e.g., objects and/or characteristics of surroundings of the vehicle 100, such as other vehicles, road lane markings, traffic lights and/or signs, pedestrians, etc. For example, the sensor 110 may be a radar sensor, ultrasonic sensor, scanning laser range finder, light detection and ranging (lidar) device, or image processing sensor such as a camera. In particular, the sensor 110 may be a camera and may detect electromagnetic radiation in some range of wavelengths. For example, the sensor 110 may detect visible light, infrared radiation, ultraviolet light, or some range of wavelengths including visible, infrared, and/or ultraviolet light. For example, the camera can be a charge-coupled device (CCD), complementary metal oxide semiconductor (CMOS), or any other suitable type.

The sensor 110 is fixed relative to one of the body panels 130. For example, the sensor 110 may be mounted to a frame member (not shown), and the body panel 130 may be mounted to the same frame member. The body panel 130 may include an aperture 135 to accommodate the sensor 110. The body panel 130 with the aperture 135 may be included in the sensor-cleaning system 105. The sensor 110 is oriented outward relative to the vehicle 100 from the body panel 130. For example, the body panel 130 may be the front bumper or grill, and the sensor 110 may be oriented in a vehicle-forward direction. For another example, the body panel 130 may be a rear bumper or trunk, and the sensor 110 may be oriented in a vehicle-rearward direction. A forward-facing sensor 110 has a high exposure to dust, so the design herein is particularly useful for a forward-facing sensor 110.

The sensor 110 includes the lens 120. The lens 120 is transparent with respect to a medium that the sensor 110 is capable of detecting, and the lens 120 may focus the medium within the sensor 110. For example, the lens 120 may be convex. The lens 120 may define the field of view of the sensor 110. The field of view is a solid angle defining the region of the environment that the sensor 110 detects. The sensor 110 defines an axis A extending through a middle of the field of view. The axis A extends in a direction in which the sensor 110 is aimed. The axis A is transverse, e.g., perpendicular, to the body panel 130 at a location of the sensor 110 on the body panel 130.

The lens 120 may include a coating, e.g., a coating that is conductive. The coating can be transparent, permitting uninhibited operation by the sensor 110. The coating is conductive, for example, aluminum-doped zinc oxide. The coating may be applied to the lens 120 using, e.g., atomic layer deposition. When the electrode 115 is energized, the coating and the electrode 115 may form an electrical potential field that electrostatically draws dust toward the electrode 115 and away from the lens 120.

The electrode 115 is energizable to generate a charge differential with the lens 120. For example, a voltage may be applied to the electrode 115 and/or the coating of the lens 120. The electrode 115 and the lens 120 thereby become the positive and negative poles (or vice versa) of an electric field. Because dust particles carry a charge, the electric field acts on the dust particles to draw the dust particles away from the lens 120 and toward the electrode 115. The electrode 115 can be switchable between an energized state and a deenergized state. In the energized state, a voltage is applied to the electrode 115 to create a charge differential with the lens 120. In the deenergized state, the voltage is prevented from being applied, e.g., by opening a first switch between a voltage source and the electrode 115. In the deenergized state, the electrode 115 may also be discharged, e.g., by closing a second switch to connect the electrode 115 to ground.

The electrode 115 is positioned to draw dust from the lens 120 when the electrode 115 is energized. For example, the electrode 115 may be positioned sufficiently close that the voltage applied to the electrode 115 will draw dust from the lens 120 to the electrode 115, and the electrode 115 may be positioned sufficiently far from the lens 120 that the movement of the dust takes the dust out of the field of view of the sensor 110. In particular, the electrode 115 is offset from the lens 120 along the axis A. If the electrode 115 is movable as in the examples of FIGS. 1B-D, then the electrode 115 is offset from the lens 120 along the axis A in at least one position of the electrode 115. The electrode 115 may be offset from the lens 120 in a direction away from the body 125 of the vehicle 100. The offset between the electrode 115 and the lens 120 may orient the electric field to help lift the dust off the lens 120.

The sensor-cleaning system 105 may include an extendable member 140. The extendable member 140 may extend and retract parallel to the axis A. The extendable member 140 may include any suitable type of linear actuator, e.g., electromechanical, linear motor, piezoelectric, hydraulic, pneumatic, etc. For example, the extendable member 140 may include a liquid nozzle and/or an air nozzle for cleaning the sensor 110. The liquid nozzle and/or the air nozzle may be aimed at the lens 120 when the extendable member 140 is extended. A top of the extendable member 140 may be flush with the body panel 130 when the extendable member 140 is retracted.

With reference to FIG. 1A, the electrode 115 may be stationary. The electrode 115 may be offset from the lens 120 along the axis A, e.g., fixedly offset from the body panel 130 in a direction away from the body 125 of the vehicle 100. The electrode 115 may extend completely around the axis A. For example, the electrode 115 may have a ring shape that is centered on the axis A and that defines a plane perpendicular to the axis A. The ring shape of the electrode 115 may have a diameter sized to keep the electrode 115 out of the field of view of the sensor 110. The ring shape, along with its orientation, is useful with a stationary electrode 115 for keeping the electrode 115 out of the field of view while providing complete coverage of the lens 120.

Figure 1B:
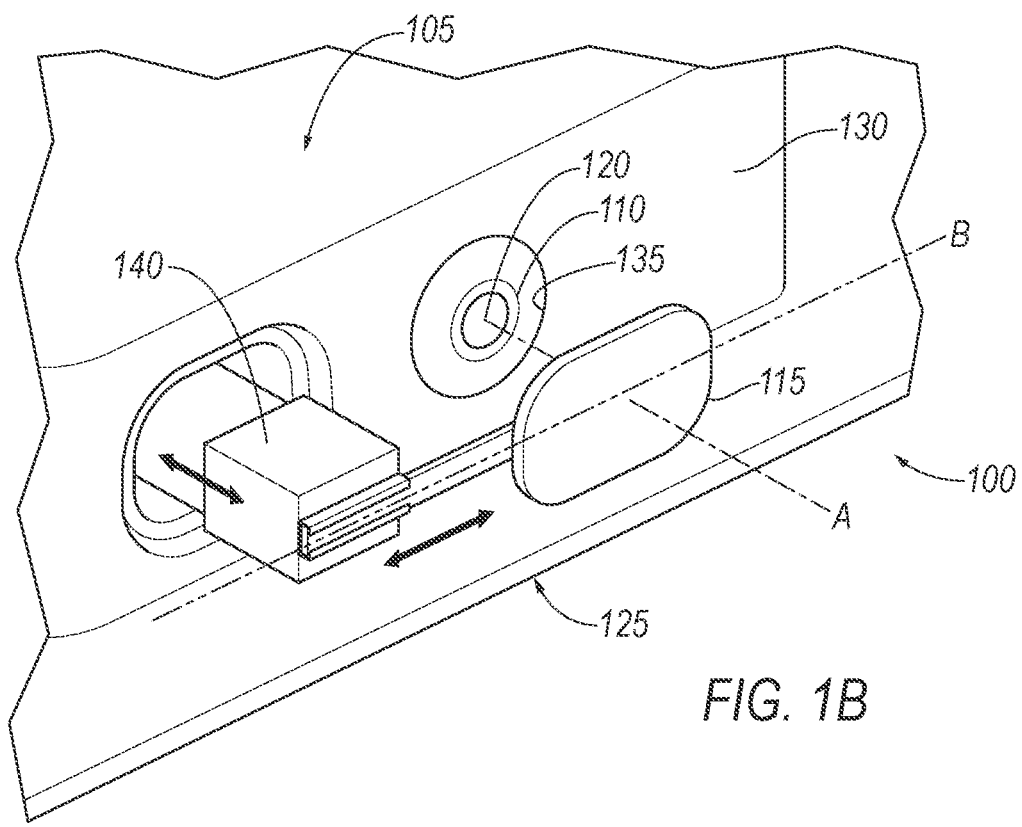
FIG. 1B is a perspective view of another example sensor-cleaning system on the vehicle.
Figure 1C:
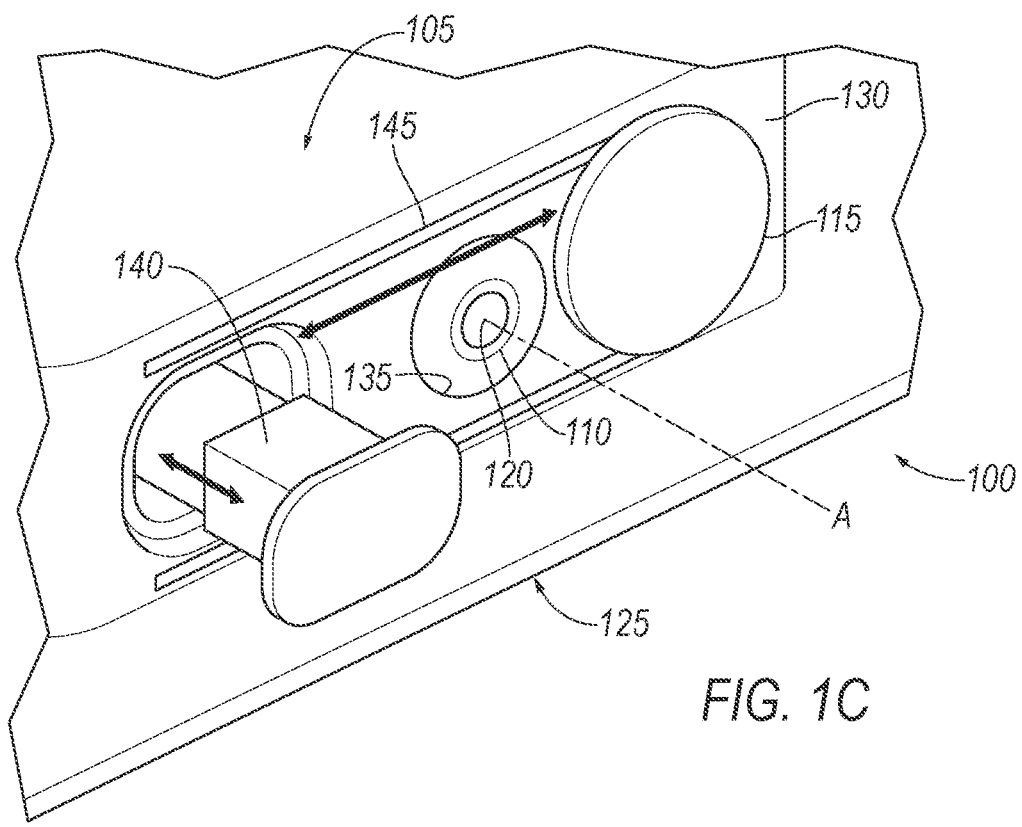
FIG. 1C is a perspective view of another example sensor-cleaning system on the vehicle.
Figure 1D:
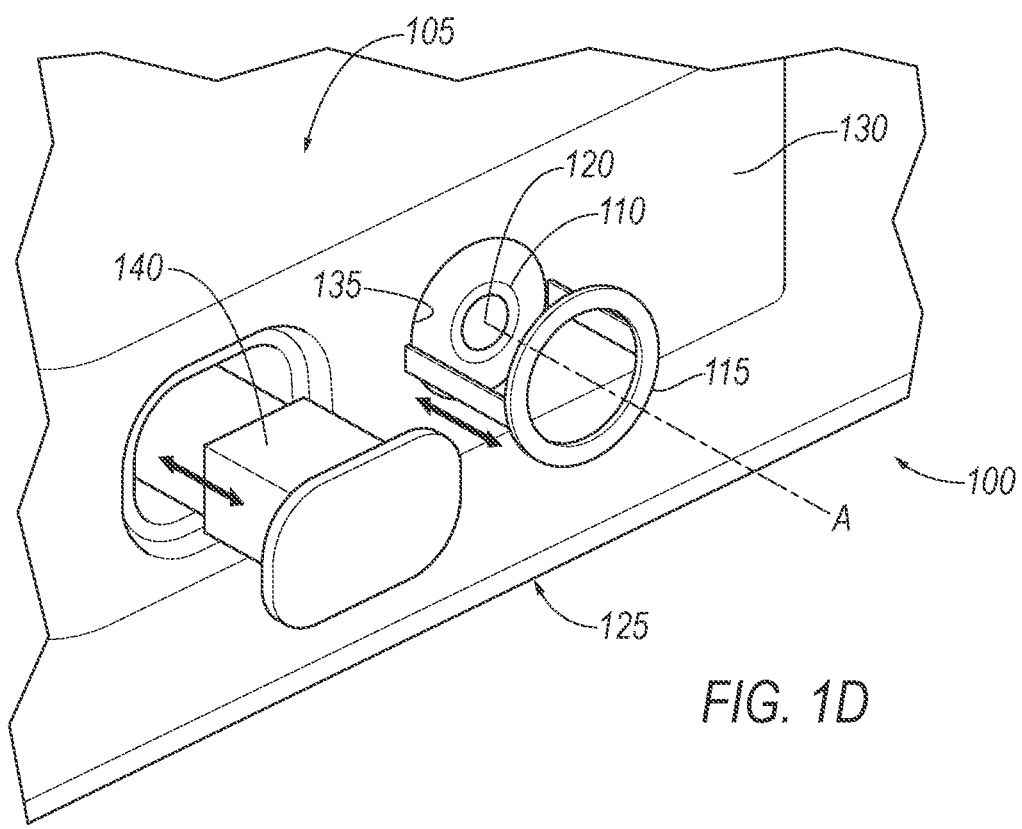
FIG. 1D is a perspective view of another example sensor-cleaning system on the vehicle.

With reference to FIGS. 1B-D, the electrode 115 may be movable between an extended position and a retracted position. The electrode 115 may include any suitable type of linear actuator, e.g., electromechanical, linear motor, piezoelectric, hydraulic, pneumatic, etc. The electrode 115 is offset from the lens 120 along the axis A in at least one of the positions, e.g., the extended position. The position of the electrode 115 may be linked to the state of the electrode 115 as energized or deenergized. For example, the electrode 115 may be configured to energize upon moving to the extended position and to deenergize upon receiving a command to move to the retracted position.

With reference to FIG. 1B, the electrode 115 may be mounted to the extendable member 140. The electrode 115 may be movable relative to the extendable member 140 between the retracted position and the extended position. For example, the electrode 115 may slide along a second axis B transverse to, e.g., perpendicular to, the axis A. In the retracted position, the electrode 115 may be out of the field of view of the sensor 110, and in the extended position, the electrode 115 may be obstructing the field of view of the sensor 110. The electrode 115 may have a plate shape oriented perpendicular to the axis A that provides complete coverage of the lens 120 in the extended position. The electrode 115 may extend over an entire area of the lens 120 when viewed along the axis A, i.e., the electrode 115 when projected along the axis A toward the lens 120 intersects with an entirety of the lens 120. The electrode 115 may be movable between the extended position and the retracted position when the extendable member 140 is extended, and the electrode 115 may be kept in the retracted position when the extendable member 140 is retracted.

With reference to FIG. 1C, the sensor-cleaning system 105 may include at least one rail 145, e.g., two rails 145, fixed relative to the sensor 110. For example, the rails 145 may be mounted on an exterior surface of the body panel 130. The rails 145 may extend past the aperture 135 on two sides. The electrode 115 may be slidably attached to the rails 145. The electrode 115 is movable between the extended position and the retracted position along the rails 145. The electrode 115 may have multiple retracted positions, e.g., retracted positions on either side of the aperture 135 along the rails 145. In the retracted positions, the electrode 115 may be out of the field of view of the sensor 110, and in the extended position, the electrode 115 may be obstructing the field of view of the sensor 110. The electrode 115 may have a plate shape oriented perpendicular to the axis A that provides complete coverage of the lens 120 in the extended position. In the extended position, the electrode 115 may extend over an entire area of the lens 120 when viewed along the axis A, i.e., the electrode 115 when projected along the axis A toward the lens 120 intersects with an entirety of the lens 120. In a first retracted position, the electrode 115 may cover the extendable member 140. The electrode 115 may be movable between the extended position and the retracted positions when the extendable member 140 is retracted, and the electrode 115 may be kept in a second retracted position when the extendable member 140 is extended, e.g., on an opposite side of the aperture 135 from the extendable member 140.

With reference to FIG. 1D, the electrode 115 may be movable between the extended position and the retracted position along the axis A. The electrode 115 may extend completely around the axis A. For example, the electrode 115 may have a ring shape that is centered on the axis A and that defines a plane perpendicular to the axis A. In the retracted position, the electrode 115 may be flush with the body panel 130 or recessed within the body panel 130. In the extended position, the electrode 115 may be offset from the lens 120 along the axis A away from the body 125 of the vehicle 100. The ring shape of the electrode 115 may have a diameter sized to keep the electrode 115 out of the field of view of the sensor 110 when the electrode 115 is in the extended position. The ring shape, along with its orientation, is useful with for keeping the electrode 115 out of the field of view even when in the extended position while providing complete coverage of the lens 120.

Figure 2:
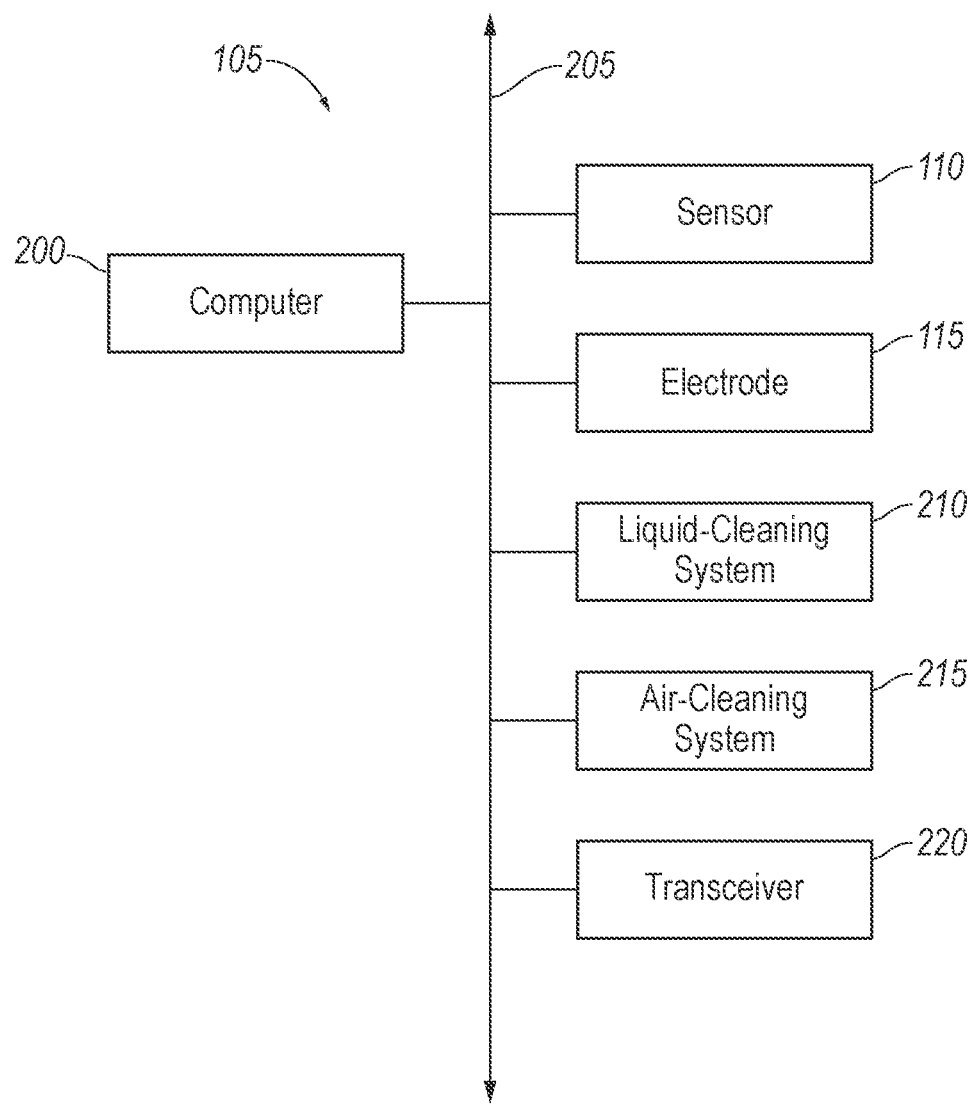
FIG. 2 is a block diagram of the vehicle.

With reference to FIG. 2, the computer 200 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 200 can thus include a processor, a memory, etc. The memory of the computer 200 can include media for storing instructions executable by the processor as well as for electronically storing data and/or databases, and/or the computer 200 can include structures such as the foregoing by which programming is provided. The computer 200 can be multiple computers coupled together.

The computer 200 may transmit and receive data through a communications network 205 such as a controller area network (CAN) bus, Ethernet, WiFi, Local Interconnect Network (LIN), onboard diagnostics connector (OBD-II), and/or by any other wired or wireless communications network. The computer 200 may be communicatively coupled to the sensor 110, the electrode 115, a liquid-cleaning system 210, an air-cleaning system 215, a transceiver 220, and other components via the communications network 205.

The sensor-cleaning system 105 may include the liquid-cleaning system 210. The liquid-cleaning system 210 may include a reservoir, a pump, valves, liquid supply lines, liquid nozzles, etc. The liquid-cleaning system 210 distributes washer fluid stored in the reservoir to the liquid nozzles. The reservoir stores the washer fluid. "Washer fluid" is any liquid stored in the reservoir for cleaning. The washer fluid may include solvents, detergents, diluents such as water, etc. The pump forces the washer fluid from the reservoir to the liquid nozzles through the liquid supply lines. The reservoir, the pump, and the liquid nozzles are fluidly connected to each other (i.e., fluid can flow from one to the other). At least one of the liquid nozzles may be mounted to the extendable member 140 and can spray the sensor 110 when the extendable member 140 is extended.

The sensor-cleaning system 105 may include the air-cleaning system 215. The air-cleaning system 215 may include a compressor, a filter, air supply lines, air nozzles, etc. The compressor pressurizes the air to force the air through the air supply lines. The compressor, the filter, and the air nozzles are fluidly connected to each other (i.e., fluid can flow from one to the other) in sequence through the air supply lines. At least one of the air nozzles may be mounted to the extendable member 140 and can blow at the sensor 110 when the extendable member 140 is extended.

The transceiver 220 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 220 may be adapted to communicate with a remote server, that is, a server distinct and spaced from the vehicle 100. The remote server may be located outside the vehicle 100. For example, the remote server may be associated with another vehicle (e.g., V2V communications), an infrastructure component (e.g., V2I communications), an emergency responder, a mobile device associated with the owner of the vehicle 100, etc. The transceiver 220 may be one device or may include a separate transmitter and receiver.

The computer 200 may be programmed to energize the electrode 115. For example, the computer 200 may actuate a second switch to open to electrically disconnect the electrode 115 from ground, and the computer 200 may then actuate a first switch close to electrically connect the electrode 115 to a voltage source, e.g., a battery.

The computer 200 may be programmed to deenergize the electrode 115. For example, the computer 200 may actuate the first switch to open to electrically disconnect the electrode 115 from the voltage source, and the computer 200 may then actuate the second switch to electrically connect the electrode 115 to ground The computer 200 may be programmed to instruct the electrode 115 to move to the extended position in response to energizing the electrode 115, e.g., in response to commanding the electrode 115 to energize or determining to command the electrode 115 to energize. For example, the computer 200 may be programmed to, upon determining to command the electrode 115 to energize based on conditions described below, energize the electrode 115, instruct the electrode 115 to move to the extended position, and/or instruct the extendable member 140 to move, in a predefined sequence. For the example of FIG. 1B, the predefined sequence may be to extend the extendable member 140, then move the electrode 115 to the extended position, and then energize the electrode 115. For the example of FIG. 1C, the predefined sequence may be to move the electrode 115 to the extended position and then energize the electrode 115.

The computer 200 may be programmed to instruct the electrode 115 to move to the retracted position in response to deenergizing the electrode 115, e.g., in response to commanding the electrode 115 to deenergize or determining to command the electrode 115 to deenergize. For example, the computer 200 may be programmed to, upon determining to command the electrode 115 to deenergize based on conditions described below, deenergize the electrode 115, instruct the electrode 115 to move to the retracted position, and/or instruct the extendable member 140 to move, in a predefined sequence. The predefined sequence connected to deenergizing the electrode 115 may be in the reverse order of the predefined sequence connected to energizing the electrode 115. For the example of FIG. 1B, the predefined sequence may be to deenergize the electrode 115, then move the electrode 115 to the retracted position, and then retract the extendable member 140. For the example of FIG. 1C, the predefined sequence may be to deenergize the electrode 115 and then move the electrode 115 to the retracted position.

Energizing the electrode 115 may be conditional on the vehicle 100 moving. In other words, the computer 200 may be programmed to, in response to the vehicle 100 moving, energize the electrode 115. The computer 200 may determine that the vehicle 100 is moving based on a speed of the vehicle 100 being greater than zero. Deenergizing the electrode 115 may be conditional on the vehicle 100 being stationary. In other words, the computer 200 may be programmed to, in response to the vehicle 100 being stationary, deenergize the electrode 115. The computer 200 may classify the vehicle 100 as stationary even if the vehicle 100 is on and even if the vehicle 100 is in a gear other than park or neutral, e.g., a forward gear. In other words, the computer 200 is programmed to deenergize the electrode 115 in response to the vehicle 100 being stationary while the vehicle 100 is on or while the vehicle 100 is in a forward gear. This helps prevent individuals from touching the electrode 115 while energized.

The computer 200 may be programmed to determine a dirtiness metric for the sensor 110. The dirtiness metric is a measure, e.g., a numerical value, indicating how obstructed the lens 120 of the sensor 110 is by dust, dirt, etc. For example, determining the dirtiness metric may be based on data from the sensor 110. For example, the computer 200 may determine, e.g., according to known image-analysis techniques, that a set of pixels in image data received from the sensor 110 is unchanging over time compared to the other of the pixels in the image data, suggesting that a portion of the field of view of the sensor 110 has been covered. The dirtiness metric may be the proportion of pixels that are covered.

For another example, determining the dirtiness metric may be based on an air quality index for a current location of the vehicle 100. The air quality index is a measure of how clear the air is. The air quality index may be publicly available weather data, e.g., determined according to standards issued by the Environmental Protection Agency. The computer 200 may receive the air quality index via the transceiver 220. The dirtiness metric may be a mathematical function of the air quality index. For example, the dirtiness metric may be set equal to the air quality index. For another example, the dirtiness metric may be a mathematical function of the air quality index and the data from the sensor 110, e.g., including a linear relationship with the air quality index.

The computer 200 may be programmed to energize or deenergize the electrode 115 based on the dirtiness metric in combination with whether the vehicle 100 is moving or stationary. For example, the computer 200 may be programmed to energize the electrode 115 in response to the dirtiness metric being above a threshold and deenergize the electrode 115 in response to the dirtiness metric being below the threshold, and the value of the threshold may depend on whether the vehicle 100 is moving. The threshold may be a low threshold if the vehicle 100 is moving and a high threshold if the vehicle 100 is stationary, and the high threshold is higher than the low threshold. The low threshold may be chosen to indicate degraded performance by the sensor 110, and the high threshold may be chosen to indicate significantly degraded performance by the sensor 110. In other words, the computer 200 may be programmed to, in response to the vehicle 100 moving and the dirtiness metric being above the low threshold, energize the electrode 115, and, in response to the dirtiness metric being below the low threshold, deenergize the electrode 115. The computer 200 may be programmed to, in response to the vehicle 100 being stationary and the dirtiness metric being above the high threshold, energize the electrode 115. Thus, when the dirtiness metric is between the high and low thresholds, the computer 200 energizes the electrode 115 in response to the vehicle 100 moving and deenergizes the threshold in response to the vehicle 100 being stationary.

The computer 200 may be programmed to, upon determining that a person is present based on the data from the sensor 110, deenergize the electrode 115. Deenergizing the electrode 115 upon determining that a person is present may override the other determinations described above. For example, the computer 200 may deenergize the electrode 115 in response to a person being present for any value of the dirtiness metric and for the vehicle 100 being stationary or moving.

The computer 200 can identify an object as a person using conventional image-recognition techniques, e.g., a convolutional neural network programmed to accept images from the sensor 110 as input and output an identified object. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential object, and the final output is the object with the highest score. If the object with the highest score is "person," then the computer 200 has determined that a person is present.

Energizing the electrode 115 may be coordinated with actuating the liquid-cleaning system 210 and/or the air-cleaning system 215. For example, the computer 200 may be programmed to actuate the liquid-cleaning system 210 and/or the air-cleaning system 215 upon energizing the electrode 115, e.g., in response to commanding the electrode 115 to energize or determining to command the electrode 115 to energize. For another example, the computer 200 may be programmed to inhibit actuation of the liquid-cleaning system 210 and/or the air-cleaning system 215 in response to the electrode 115 being energized. For another example, the computer 200 may be programmed to actuate the air-cleaning system 215 and inhibit the liquid-cleaning system 210 in response to the electrode 115 being energized. The air-cleaning system 215 may help loosen dust from the lens 120, and the liquid-cleaning system 210 may interfere with the electric field established by the electrode 115. For another example, the computer 200 may be programmed to actuate the liquid-cleaning system 210 and/or the air-cleaning system 215 in a predefined sequence with energizing the electrode 115, e.g., actuating the liquid-cleaning system 210 to spray the lens 120 for a predetermined time and then energizing the electrode 115. For another example, the computer 200 may select from the foregoing examples based on the dirtiness metric, e.g., actuating the air-cleaning system 215 in response to the electrode 115 being energized when the dirtiness metric is above the high threshold and energizing the electrode 115 without actuating the air-cleaning system 215 when the dirtiness metric is below the high threshold.

Figure 3:
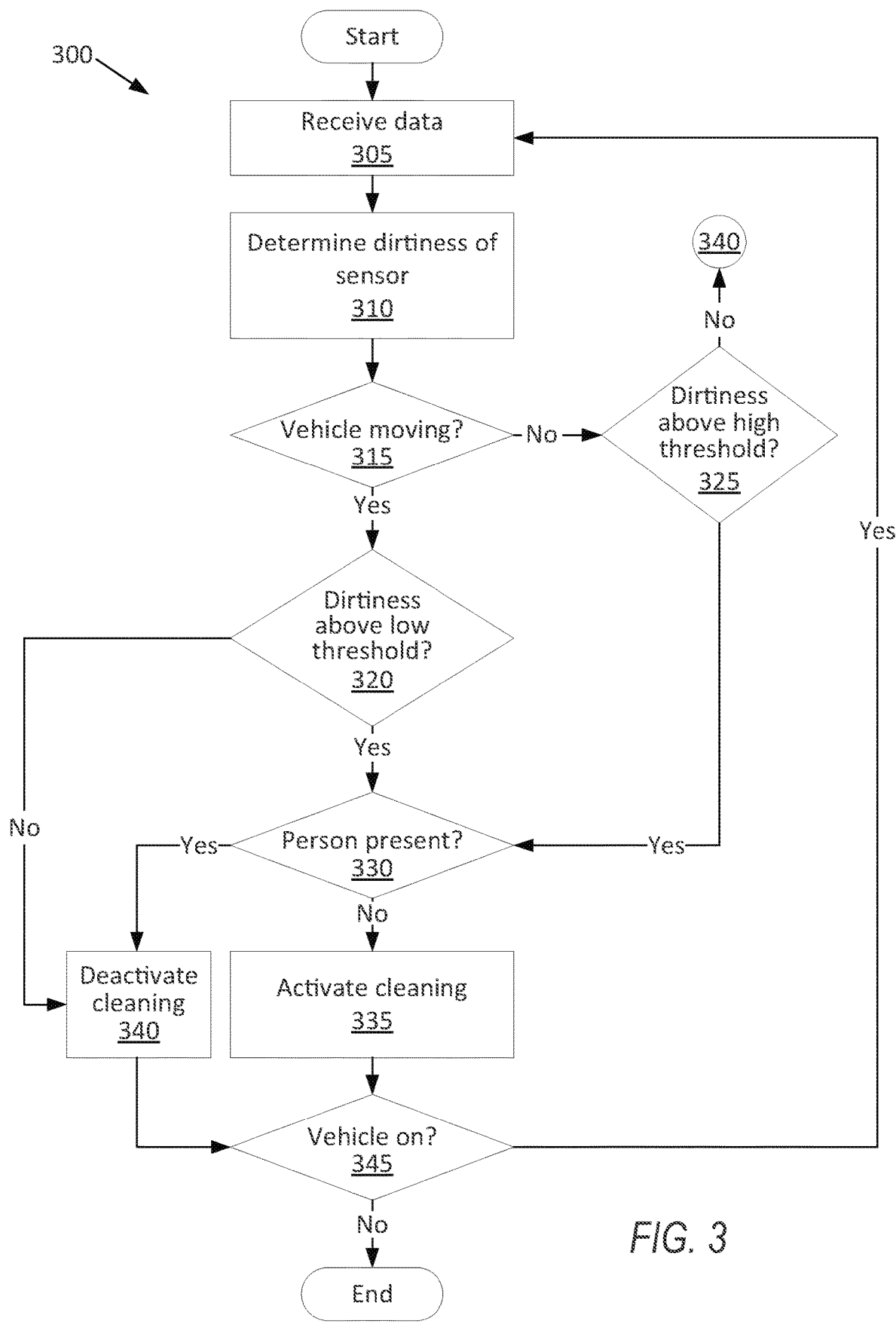
FIG. 3 is a process flow diagram of an example process for cleaning the sensor.

FIG. 3 is a process flow diagram illustrating an example process 300 for cleaning the sensor 110. The memory of the computer 200 stores executable instructions for performing the steps of the process 300 and/or programming can be implemented in structures such as mentioned above. The process 300 may begin in response to the vehicle 100 being turned on. As a general overview of the process 300, the computer 200 receives data from the sensor 110, air quality data, and speed data and determines the dirtiness metric. The computer 200 energizes the electrode 115 in response to (1) the vehicle 100 moving, the dirtiness being above the low threshold, and no person being present or (2) the vehicle 100 being stationary, the dirtiness being above the high threshold, and no person being present. The computer 200 deenergizes the electrode 115 in response to (1) the dirtiness being below the low threshold, (2) a person being present, or (3) the vehicle 100 being stationary and the dirtiness metric being below the high threshold. The process 300 continues for as long as the vehicle 100 remains on.

The process 300 begins in a block 305, in which the computer 200 receives the data from the sensor 110, the air quality index, and the speed data.

Next, in a block 310, the computer 200 determines the dirtiness metric for the sensor 110 based on the data from the sensor 110 and/or the air quality index, as described above.

Next, in a decision block 315, the computer 200 determines whether the vehicle 100 is moving or stationary based on the speed data, as described above. In response to the vehicle 100 moving, the process 300 proceeds to a decision block 320. In response to the vehicle 100 being stationary, the process 300 proceeds to a decision block 325.

In the decision block 320, the computer 200 determines whether the dirtiness metric is above the low threshold, as described above. In response to the dirtiness metric being above the low threshold, the process 300 proceeds to a decision block 330. In response to the dirtiness metric being below the low threshold, the process 300 proceeds to a block 340.

In the decision block 325, the computer 200 determines whether the dirtiness metric is above the high threshold, as described above. In response to the dirtiness metric being above the high threshold, the process 300 proceeds to the decision block 330. In response to the dirtiness metric being below the high threshold, the process 300 proceeds to the block 340.

In the decision block 330, the computer 200 determines whether a person is present based on the data from the sensor 110, as described above. Upon determining that a person is present, the process 300 proceeds to the block 340. Upon determining that no person is present, the process 300 proceeds to a block 335.

In the block 335, the computer 200 energizes the electrode 115, as described above. The computer 200 also may move the electrode 115, extend or retract the extendable member 140, actuate the liquid-cleaning system 210, and/or actuate the air-cleaning system 215 in some sequence, as described above. After the block 335, the process 300 proceeds to a decision block 345.

In the block 340, the computer 200 deenergizes the electrode 115, as described above. The computer 200 also may move the electrode 115, extend or retract the extendable member 140, actuate the liquid-cleaning system 210, and/or actuate the air-cleaning system 215 in some sequence, as described above. After the block 340, the process 300 proceeds to the decision block 345.

In the decision block 345, the computer 200 determines whether the vehicle 100 is still on. If so, the process 300 returns to the block 305 to continue monitoring whether to energize or deenergize the electrode 115. If not, the process 300 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A sensor-cleaning system comprising:
a sensor of a vehicle, the sensor including a lens;
an electrode positioned to draw dust from the lens when the electrode is energized; and
a computer communicatively coupled to the electrode;
wherein the computer is programmed to:
energize the electrode in response to the vehicle moving; and
deenergize the electrode in response to the vehicle being both on and stationary.

2. The sensor-cleaning system of claim 1, wherein
the computer is communicatively coupled to the sensor; and
the computer is further programmed to deenergize the electrode upon determining that a person is present within a field of view of the sensor, wherein determining that the person is present is based on data from the sensor.

3. The sensor-cleaning system of claim 1, wherein the computer is further programmed to determine a dirtiness metric for the sensor.

4. The sensor-cleaning system of claim 3, wherein
the programming to energize the electrode in response to the vehicle moving includes programming to energize the electrode in response to the vehicle moving and the dirtiness metric being above a threshold; and
the computer is further programmed to deenergize the electrode in response to the dirtiness metric being below the threshold.

5. The sensor-cleaning system of claim 4, wherein
the threshold is a low threshold;
the programming to deenergize the electrode in response to the vehicle being stationary includes programming to deenergize the electrode in response to the vehicle being stationary and the dirtiness metric being below a high threshold;

the computer is further programmed to energize the electrode in response to the vehicle being stationary and the dirtiness metric being above the high threshold; and the high threshold is higher than the low threshold.

6. The sensor-cleaning system of claim 5, wherein the programming to deenergize the electrode in response to the vehicle being stationary includes programming to deenergize the electrode in response to the vehicle being stationary and a person being present within the field of view of the sensor for any value of the dirtiness metric, wherein determining that the person is present is based on data from the sensor.

7. The sensor-cleaning system of claim 3, wherein the computer is communicatively coupled to the sensor, and determining the dirtiness metric is based on data from the sensor.

8. The sensor-cleaning system of claim 3, wherein determining the dirtiness metric is based on an air quality index for a current location of the vehicle.

9. The sensor-cleaning system of claim 1, wherein
the sensor defines an axis extending through a middle of a field of view of the sensor; and
the electrode is offset from the lens along the axis.

10. The sensor-cleaning system of claim 1, wherein the electrode is stationary.

11. The sensor-cleaning system of claim 1, wherein the electrode is movable between an extended position and a retracted position.

12. The sensor-cleaning system of claim 11, wherein the computer is further programmed to instruct the electrode to move to the extended position in response to energizing the electrode.

13. The sensor-cleaning system of claim 11, wherein the computer is further programmed to instruct the electrode to move to the retracted position in response to deenergizing the electrode.

14. The sensor-cleaning system of claim 11, wherein
the sensor defines an axis extending through a middle of a field of view of the sensor; and
the electrode is movable between the extended position and the retracted position along the axis.

15. The sensor-cleaning system of claim 11, further comprising a rail fixed relative to the sensor, wherein the electrode is movable between the extended position and the retracted position along the rail.

16. The sensor-cleaning system of claim 1, wherein
the sensor defines an axis extending through a middle of a field of view of the sensor; and
the electrode extends completely around the axis.

17. The sensor-cleaning system of claim 1, wherein the lens includes a coating that is conductive.

18. The sensor-cleaning system of claim 17, wherein
the sensor is a camera; and
the coating is transparent.

19. The sensor-cleaning system of claim 1, wherein the programming to deenergize the electrode in response to the vehicle being stationary includes programming to deenergize the electrode in response to the vehicle being stationary while the vehicle is on.

20. A method comprising:
energizing, by a computer programmed to do so, an electrode in response to a vehicle moving, the vehicle including the electrode, the computer communicatively coupled to the electrode, and a sensor including a lens, the electrode being positioned to draw dust from the lens when the electrode is energized; and
deenergizing, by the computer programmed to do so, the electrode in response to the vehicle being both on and stationary.

* * * * *